United States Patent

[11] 3,590,629

| [72] | Inventor | Paul Courbon |
| | | Verneuil-En-Halatte, France |
| [21] | Appl. No. | 25,691 |
| [22] | Filed | Apr. 6, 1970 |
| [45] | Patented | July 6, 1971 |
| [73] | Assignee | Charbonnages De France |
| | | Paris, France |
| [32] | Priority | Apr. 4, 1969 |
| [33] | | France |
| [31] | | 69/10,594 |

[54] DEVICE FOR THE CONTINUOUS DETECTION OF DUST IN THE ATMOSPHERE
16 Claims, 7 Drawing Figs.

| [52] | U.S. Cl. | 73/28 |
| [51] | Int. Cl. | G01n 31/00 |
| [50] | Field of Search | 73/421, 421.5, 421.5 A, 28 |

[56] References Cited
UNITED STATES PATENTS

| 3,092,583 | 4/1963 | Wolff et al. | 73/28 |
| 3,458,974 | 8/1969 | Orr, Jr. | 73/28 |

*Primary Examiner*—S. Clement Swisher
*Attorney*—Karl W. Flocks

ABSTRACT: A thin filter element is mounted integrally with a centrifugal fanlike rotor so that when the rotor is rotated air will be drawn through the filter. This assembly is mounted within a fairly spaceous enclosure with limited ingress and egress orifices so that air will tend to be recirculated within the enclosure. Solid particles in the air entering the enclosure will tend to be collected in a spot at the center of the filter element, the size of the spot being a measure of the amount of dust in the air.

PATENTED JUL-6 1971

INVENTOR
Paul Courbon

BY Karl W. Flocks
ATTORNEY

DEVICE FOR THE CONTINUOUS DETECTION OF DUST IN THE ATMOSPHERE

In order to give effective protection to the human organism against the effects of dust in suspension in the atmosphere which he breathes, it is necessary to obtain information on this dust; for that purpose it is essential to take samples of the polluted atmosphere and to collect the dust which such samples contain for experimentation thereof and to determine their noxiousness.

There have been known for a long time devices of various types which provide for brief and repeated sampling of a polluted atmosphere, the dust contained in the extracted samples of polluted air being collected by appropriate filtration means. These devices permit the collection of a sample of dust sufficient to evaluate noxiousness, subsequent to sampling, in accordance with transitional criteria, namely the characteristics of the dust (granulometric distribution, mineralogical composition, shape of the particles) and their concentration in the volume of air sampled.

Now, it has been shown that less importance should be given to the size of the dust and to its nature than to the total mass of the dust absorbed. Furthermore, the interest of specialists has been increasingly directed to concentrations of increasingly low values.

These two reasons have resulted in the replacement of instantaneous and repeated sampling by prolonged sampling, from which a more representative sample of the dust collected can be obtained. Thus, it is desirable that the devices by which such continuous and prolonged samplings are made, can operate without supervision, can be autonomous from the power supply point of view, and can be simple to handle. However, the known sampling devices necessitate the stopping of sampling and the extraction of the filtering element in order to evaluate subsequently the total mass of dust collected, for example by weighing the filtering element before and after sampling.

The present invention, to the contrary, relates to an apparatus which permits continuous and prolonged sampling to be effected and which does not require any subsequent handling of the filtering element in order to evaluate the rate of dust loading in the atmosphere under examination.

The apparatus according to the invention is characterized by the presence of a rotor, constituted by a thin filtering element and a radial fan maintained together for rotation, rotated at a high and preferably constant speed in the interior of a closed extraction chamber provided with an axial suction orifice arranged on the side of the filtering element, and evacuation orifices arranged on the fan side, the sections of the suction and evacuation orifices and also the diameter of the chamber with respect to the external diameter of the moving system being chosen in such manner that the suction and evacuation flow rates are very much less than the actual flow rate of the radial fan.

It is, accordingly, an object of the present invention to overcome the defects of the prior art, such as indicated above.

It is another object of the present invention to provide for continuous and prolonged sampling without supervision, with automonous power supply and in a simple manner.

It is another object of the present invention to provide an apparatus which permits continuous and prolonged sampling to be effected and which does not require subsequent handling of the filtering element in order to evaluate the rate of dust loading in the atmosphere under examination.

These and other objects and advantages will be more clearly understood with reference to the description of embodiments which follows below in respect of the accompanying drawings, in which.

Figure 1:
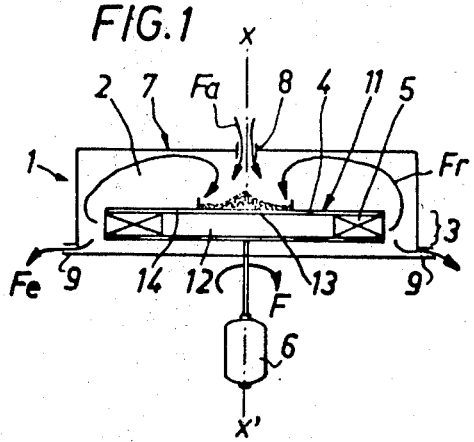
FIG. 1 shows in longitudinal section, the basic diagram of the apparatus according to the invention.

In the FIGS. of the accompanying drawings, the reference 1 indicates a cylindrical casing having an axis $X'-X$ defining a closed extraction chamber 2 containing a rotor 3 constituted by a thin filtering element 4, of the filtering diaphragm type, and by a radial fan 5 driven in rotation at high and preferably constant speed in the direction shown by the arrow F, by any appropriate means, such as, for example, an electric motor 6.

The upper face 7 of the casing directly overlying the filtering element 4 is provided with an axial suction orifice 8, while the sidewall of the casing is provided with a plurality of peripheral evacuation orifices 9 located at the side of the fan 5.

Rotation of the rotary system 3, by carrying air into the interior of the chamber r 2, creates a dynamic condition which generates a pressure difference between the center of the chamber 2 and its periphery. This results in a suction of the outside air through the suction orifice 8 (arrows $Fa$) and an expulsion of the air contained in the chamber 2 through the evacuation orifices 9 (arrows $Fe$).

The value of the diameter of the chamber 2 with respect to that of the external diameter of the rotor 3, and also the values of the sections of the orifices 8 and 9 are chosen in such manner that the suction and evacuation flow rate of the apparatus is very much less than the actual flow rate of the fan; it follows that only a small portion of the air enclosed in the chamber 2 is discharged through the evacuation orifices 9 and renewed by air drawn in through the orifice 8, while the major part of the air enclosed in the chamber 2 is recycled to the interior of the casing, following the recirculation movement indicated by the arrows $Fr$.

Figure 2:
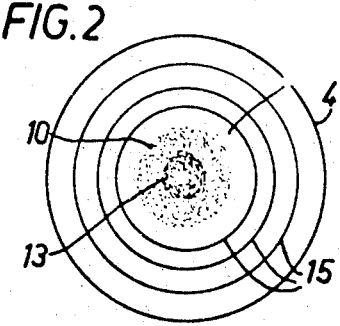
FIG. 2 is a plan view of the rotating system.

With a casing made of transparent material, it has been found that, as the depression creased by the fan is greatest at the center of the chamber 2, the streams of recirculating air $Fr$ are uniformly distributed about the axis $X'-X$ and converge, at least at the beginning of the operation of the apparatus, towards the central zone 10 of the upper face 11 of the filtering element located on the side of the orifice 8. In this movement, these recirculation streams $Fr$ force the streams of indrawn air $Fa$ to come together around the axis $X'-X$. The central zone 12 of the filtering element is thus transversed at the same time by the indrawn dust-laden air $Fa$ and by the recycled air $Fr$, and the dust in suspension in the air sucked in is deposited on the central zone 10 of the upper face of the filtering element 4, forming a circular deposit 13 which has the appearance of a spot, as shown in FIG. 2.

As the sampling proceeds, the central zone 10 of the face 11 of the filtering element 4 becomes gradually choked up and is therefore less and less permeable. The streams of air $Fa$ and $Fr$ are then spontaneously directed towards a more permeable zone, that is to say, towards the annular zone 14 surrounding the central zone, and as the sampling is prolonged, there is observed a progressive increase in the diameter and the opacity of the spot 13 of deposited dust, this increase being more rapid when the dust content is higher.

It is surprising to find that, contrary to what happens with known apparatus, the progressive choking-up of the filtering element has practically no influence on the suction flow rate of the apparatus. Everything appears to take place as if the choking of the filtering element only had an influence on the recirculation flow.

It follows that for a given filtering element and a given dust content, the diameter of the spot 13 is a direct function of the value of the dust content of the atmosphere examined. It is therefore possible to evaluate the dust content of the atmosphere examined by a simple examination of the appearance of the spot 13, from the point of view of density and diameter.

It is also possible to calibrate the apparatus, for example, by drawing on the filtering element colored concentric circles 15, of which the increasing diameters represent increasing contents of dust.

The radial fan 5 may be constituted by a centrifugal fan with blades, as shown in a diagrammatic manner in FIG. 1.

It may also be constituted, in known manner, by a thick disc 16 (FIG. 3) or a thick ring 16' (FIG. 4), made of a permeable material such as polyurethane foam or a fibrous material, attached for rotation to a plate 17 driven by the motor 6.

Figure 3:
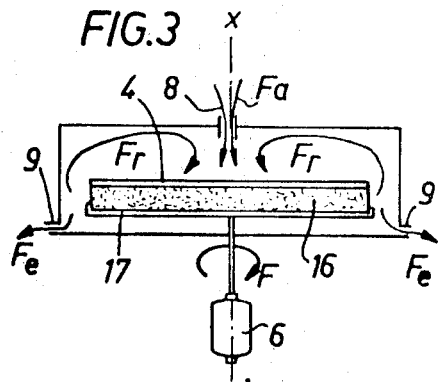
FIG. 3 is a diagrammatic view in longitudinal section of an apparatus in which the radial fan is constituted by a thick disc made of a permeable material.

In the form of construction shown in FIG. 3, the depression created by the permeable disc 16 is not uniform over the whole section of the filtering element 4, but on the contrary, varies in the inverse ratio of the radius of the zone considered. It follows that the greater the diameter of the choked zone, the greater is the subsequent increase of the section of the annular zone traversed and the increase in diameter of the resulting spot is more rapid, which comes to the same thing as saying that the apparatus become increasingly sensitive as the diameter of the blocked zone increases.

Figure 4:
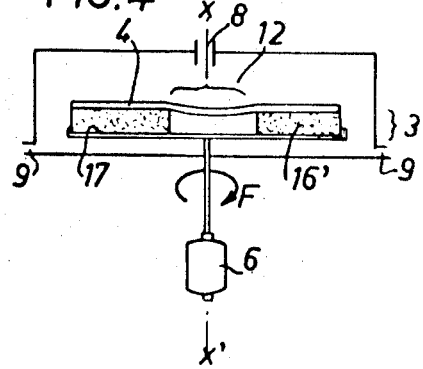
FIG. 4 is a diagrammatic view in longitudinal section of an apparatus in which the radial fan is constituted by a thick ring made of a permeable material.

On the other hand, in the form of construction shown in FIG. 4, the depression created by the permeable ring 16' is almost constant in the central zone 12 of the filtering element 4 and is not uniform in the annular zone located above the ring.

Figure 5:
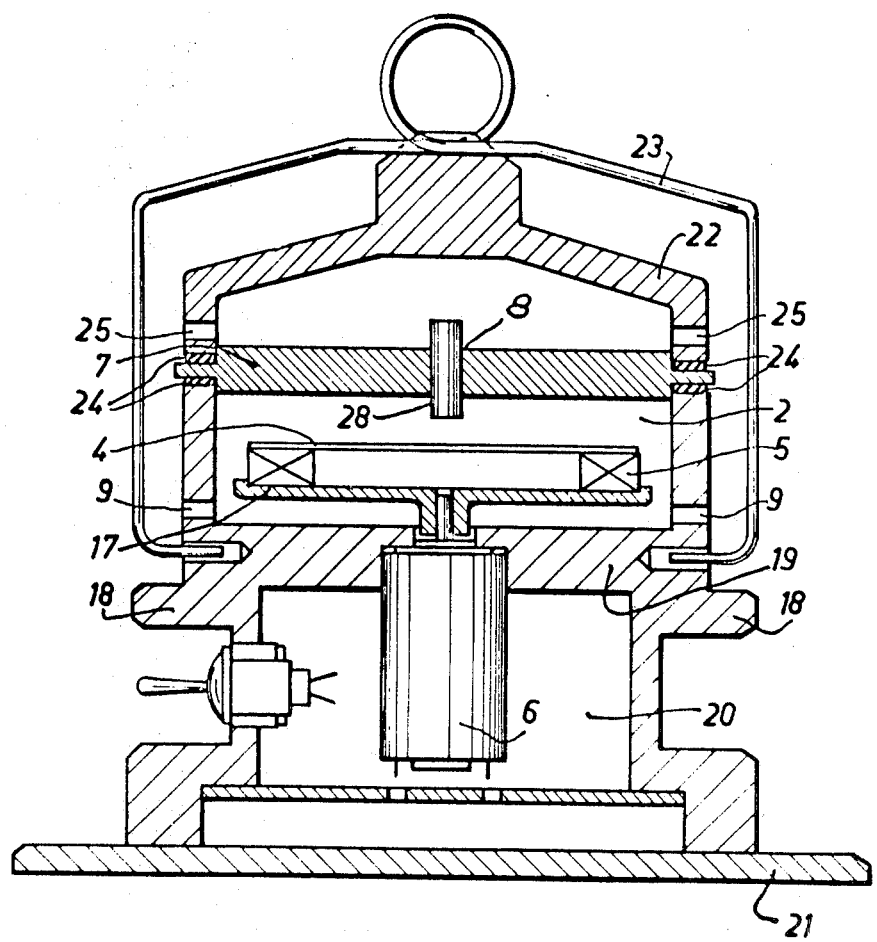
FIG. 5 is a view in longitudinal section of one form of construction of the apparatus according to the invention.

FIG. 5 shows a view in longitudinal section of a form of construction of the apparatus according to the invention, consisting of:

A lower half-casing 18 forming a base, divided by an intermediate partition 19 into a lower compartment 20 open towards the bottom and closed by a baseplate 21, and in which are installed the motor 6 and its accessories, and an upper chamber 2 open outwards the top, in which rotates the moving rotor 3, and constituting the sampling chamber;

A removable partition 7 placed on the upper chamber 2 and pierced with an axial hole 8 which forms the suction orifice of the sampling chamber; and An upper half-casing 22 forming a cover, placed on the removable partition 7 and coupled to the lower half-casing by any known means, such as the spring clip or stirrup 23 for example, air-tightness between the three elements being obtained by means of the annular joints 24.

The lateral wall of the cover 22 and the lateral wall of the sampling chamber 2 are pierced with small peripheral holes 9 and 25, uniformly distributed along the periphery of each of the said lateral walls. These holes may be radial and at right angles to the axis X'—X, as shown in FIG. 5. However, these holes can be arranged tangentially to the corresponding wall and/or inclined with respect to the axis X'—X, if desired.

This distribution of the peripheral holes, both for suction and evacuation, renders the apparatus according to the invention practically unaffected by the variations of amplitude and direction of the movements of the atmosphere in which the apparatus is placed, with insures the stability of the suction flow of the apparatus during its utilization.

In order to facilitate examination of the appearance of the deposit of dust on the filtering element 4, the removable partition 7 and the cover 22 are advantageously made of transparent material.

In addition, in the case where the filtering element 4 (see FIG. 6) is driven in rotation by a fan with blades 5, a thick permeable disc 26 may advantageously be inserted between the filtering element 4 and the fan 5, in order to make the depression of air through the filter by the fan 5 uniform over the whole section of the filtering element and thus to even out the flow of the air through the said filtering element. In order to prevent this permeable disc 26 from acting as a fan, its periphery should be fitted with a cylindrical ring 27 which is permeable to air.

In addition, in order to improve the guiding of the streams of indrawn air Fa, it may be advantageous to provide the orifice 8 with an axial conduit 28 which opens close to the face 11 of the filtering element 4.

As the depression created by the radial fan is greatest at the center of the sampling chamber, it may be found that, during the operation of the forms of construction shown in FIGS. 1 and 4, the central zone of the filtering diaphragm becomes slightly hollowed or concave. This phenomenon reduces the risk of carrying away by centrifuging the dust deposited on the peripheral zone.

Figure 7:
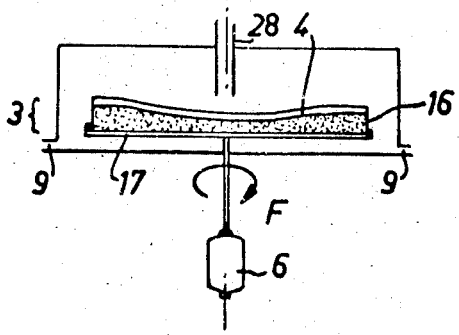
FIG. 7 is a diagrammatic view in longitudinal section of an alternative form of construction of the apparatus shown in FIG. 3.
Figure 6:
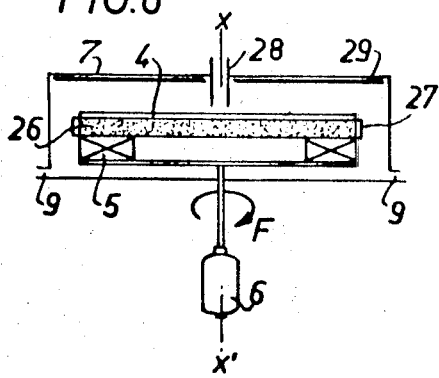
FIG. 6 is a diagrammatic view in longitudinal section of an alternative form of construction of the apparatus shown in FIG. 1.

In order to take advantage of this particular feature with a form of construction such as shown in FIG. 3 and 6, or if the diaphragm is relatively stiff, it may be advantageous to preform the rotor in such manner that it has a slight concavity, as shown in FIG. 7.

Furthermore, in order to detect the presence of particular gases in the atmosphere examined, it is possible, as shown in FIG. 6, to fix underneath the wall 7 a disc 29, of paper for example, impregnated with colored reagents, which react with particular gas to, for example, change color to indicate presence of such gas.

It will be obvious to those skilled in the art that various changes may be made without departing from the scope of the invention and the invention is not to be considered limited to what is shown in the drawings, and described in the specification.

I claim:

1. A device for the continuous sampling of dust in suspension in the atmosphere, comprising a radial fan with a vertical axis of rotation; a thin filtering element attached for rotation to said radial fan; means for rotating said fan and thin filter at a high and relatively constant speed; means for insuring recirculation of air compressing a closed sampling chamber surrounding said fan and filter and having its upper transverse wall located directly above said filtering element and provided with an axial orifice, the lateral wall of said chamber being provided with peripheral evacuation orifices disposed adjacent said fan, the relative sizes of the suction and evacuation orifices and also the size of said sampling chamber having values such that the suction and evacuation flow rate is very much less than the actual flow rate of the radial fan so as to provide said recirculation.

2. A device as claimed in claim 1, in which said radial fan is a vane fan with radial delivery.

3. A device as claimed in claim 2, in which a thick disc made of permeable material and contained in an impermeable cylindrical ring is disposed between said thin filtering element and said vane fan.

4. A device as claimed in claim 1, in which said radial fan is constituted by a thick disc made of permeable material and disposed between said thin filtering element and an impermeable supporting plate.

5. A device as claimed in claim 4, in which a cylindrical recess is hollowed out in the central zone of said disc.

6. A device in accordance with claim 3, in which said permeable material is a plastic foam.

7. A device as claimed in claim 6, in which said permeable material is polyurethane foam.

8. A device as claimed in claim 1, in which said thin filtering element has the shape of a flat disc.

9. A device as claimed in claim 1, in which the central zone of said thin filtering element is in slight depression with respect to its periphery.

10. A device as claimed in claim 1, in which said thin filtering element is a filtering diaphragm.

11. A device as claimed in claim 1, in which a cover provided with peripheral suction orifices is fixed on the upper wall of said sampling chamber.

12. A device as claimed in claim 11, in which the axes of said peripheral suction orifices and the axes of said peripheral evacuation orifices are at right angles to the axis of rotation of the rotating system.

13. A device as claimed in claim 1, in which at least the upper wall of said sampling chamber is made of transparent material.

14. A device as claimed in claim 13, in which concentric circles of increasing diameters are drawn on the free face of aid thin filtering element.

15. A device is claimed in claim 1, in which said axial suction orifice is provided with a conduit delivering in the vicinity of the free face of said thin filtering element.

16. A device as claimed in claim 1, in which an element impregnated with colored reagents is fixed under the upper wall of said sampling chamber.